United States Patent Office 2,764,580
Patented Sept. 25, 1956

2,764,580
PROCESS FOR THE PRODUCTION OF IMINODIBENZYL

Walter Schindler, Riehen, near Basel, and Franz Häfliger, Basel, Switzerland, assignors, by mesne assignments, to Geigy Chemical Corporation, New York, N. Y., a corporation of Delaware No Drawing. Application November 7, 1955,
Serial No. 545,544

Claims priority, application Switzerland
November 15, 1954

1 Claim. (Cl. 260—239)

Iminodibenzyl (10.11 - dihydro - 5-dibenzo - (b. f.)-azepine) of the formula:

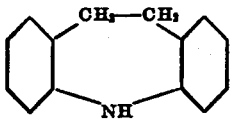

can be converted by suitable substitution at the nitrogen atom into pharmacologically valuable substances which have different effects. For example, substances with antiallergic, spasmolytic and psychoplegic activity are obtained by the introduction of dialkylamino-alkyl radicals and the introduction of dialkylamino-alkanoyl radicals produces substances with local anaesthetic activity. Starting from 2-nitrotoluene, up to now, iminodibenzyl has been produced by chlorinating to form α-chloro-2-nitrotoluene, condensing this by means of potassium hydroxide to form 2.2′-dinitrostilbene, reducing to 2.2′-diaminodibenzyl and then closing the ring by heating equimolecular amounts of the dihydrochloride of the latter compound and of the free base at 280–320°.

Of the four steps of the process described above, the chlorination produces a bad yield (about 30%) whilst the condensation and ring closure only give medium yields (50% and 65% respectively) so that only a total yield of iminodibenzyl, calculated on 2-nitrotoluene, of about 10% can be obtained.

It has now been found that a considerably higher total yield of iminodibenzyl can be obtained by a different series of steps which are an improvement on the process steps which up to now have been inadequate, by oxidising 2-nitrotoluene in the cold, i. e. between about 0–5°, with an alkyl formiate or alkyl nitrite in the presence of an alkali alcoholate to form the 2.2′-dinitrodibenzyl, reducing this by methods known per se to form 2.2′-diaminodibenzyl and finally heating the diphosphate of the latter compound at about 280–320°.

The increase in yield of iminodibenzyl attained by the reaction according to the present invention is very considerable: the oxidation of 2-nitrotoluene, e. g. with isoamyl formiate, produces a yield of about 65%, the reduction of 2.2′-dinitro-dibenzyl and the ring closure to form iminodibenzyl each produce about 90–95% which, calculated on the 2-nitrotoluene, corresponds to a total yield of over 50%.

In particular, isoamyl formiate, ethyl formiate and amyl nitrite are used as oxidising agents in the first step, sodium ethylate containing no alcohol is used as alkali alcoholate. It is of advantage to perform the oxidation in inert organic solvents and diluents such as, e. g. cyclohexane, ether, petroleum ether. The nitro groups can be reduced for example by catalytically activated hydrogen, such as e. g. hydrogen in the presence of Raney nickel in dioxan. The heating of 2.2′-diamino-dibenzyl diphosphate in the absence of solvents or diluents in the third step produces excellent yields of iminodibenzyl.

The following examples serve to further illustrate the process according to the present invention. The parts are given as parts by weight and their relationship to parts by volume is as that of grammes to cubic centimetres. The temperatures are in degree centigrade.

Example 1

(a) 548 parts of o-nitrotoluene and 464 parts of isoamyl formiate are added dropwise at −2° to 0° to 272 parts of sodium ethylate in 2000 parts by volume of cyclohexane, during which addition the temperature should remain under 5°. The whole is stirred for 21 hours at this temperature and then 1000 parts of water are added, the precipitate is drawn off on a big suction filter, thoroughly washed with water and dried at 60° in the vacuum. About 330 parts =65% of the theoretical amount of 2.2′-dinitrodibenzyl are obtained. M. P. 123°. Instead of isoamyl formiate, ethyl formiate may also be used.

(b) 140 parts of 2.2′-dinitro-dibenzyl are dissolved in 1000 parts by volume of dioxan and hydrogenated in the presence of 20 parts of Raney nickel. After the calculated amount of hydrogen has been taken up, the catalyst is drawn off under suction and 132 parts of 85% ortho-phosphoric acid are added to the residue. The diphosphate of 2.2′-diamino-dibenzyl which crystallises out is drawn off under suction and washed with a little dioxan and ethyl acetate. It is then dried at 130° in the vacuum. About 206 parts =97% of the theoretical are obtained. M. P. 266–268°.

(c) 250 parts of the diphosphate obtained according to b) are heated in a round flask for about 40 minutes at 280–320°. After cooling, the product is boiled out twice with benzene. The benzene extracts are washed with diluted hydrochloric acid and the benzene is then dried and evaporated whereupon 110 parts =92% of the theoretical amount of iminodibenzyl are obtained. M. P. 104–105°.

Example 2

34 parts of sodium ethylate are suspended in 170 parts by volume of cyclohexane, 68 parts of o-nitrotoluene and 59 parts of amyl nitrite in 160 parts by volume of cyclohexane are added dropwise at −2° to 0° and the reaction mixture is then stirred for 24 hours at 0–5°. 250 parts of water are then added and the reaction product is drawn off under suction, thoroughly washed with water and dried at 60° in the vacuum. The 2.2′-dinitrodibenzyl obtained can be converted into iminodibenzyl according to example 1b) and c). Instead of amyl nitrite, ethyl nitrite may be used.

What we claim is:

A process for the production of iminodibenzyl, which comprises the step of heating the diphosphate of 2.2′-diamino-dibenzyl to a temperature of at least 280° and at most 320°.

References Cited in the file of this patent
UNITED STATES PATENTS 2,554,736     Haefliger et al. _____ May 29, 1951

OTHER REFERENCES

Busch et al.: Ber. Deut. Chem., vol. 33, p. 2709 (1900).
Thiele et al.: Liebigs Ann., vol. 305, p. 100 (1899).
Lapworth: J. Chem. Soc., vol. 79, p. 1275 (1901).